United States Patent
Gugle

[11] 3,897,713
[45] Aug. 5, 1975

[54] DOUBLE-ENDED STUD

[75] Inventor: James Eric Gugle, Crystal Lake, Ill.

[73] Assignee: Illinois Tool Works Inc., Chicago, Ill.

[22] Filed: Mar. 6, 1974

[21] Appl. No.: 448,601

[52] U.S. Cl. .............. 85/42; 85/19; 85/23; 151/41.7; 151/14.5; 156/303.1
[51] Int. Cl.² ........................ F16B 37/04
[58] Field of Search ............ 85/63, 42, 1 C, 23, 46, 85/19, 14; 151/41.7, 14.5; 156/303.1; 264/318, 248

[56] References Cited
UNITED STATES PATENTS

| | | | |
|---|---|---|---|
| 736,121 | 8/1903 | Lipscomb | 85/42 |
| 1,126,531 | 1/1915 | Liebmann | 85/42 |
| 2,690,879 | 10/1954 | Snyder | 85/23 |
| 3,207,023 | 9/1965 | Knohl | 85/46 |
| 3,247,752 | 4/1966 | Greenleaf et al. | 85/1 TP |
| 3,417,653 | 12/1968 | Staats et al. | 85/63 |
| 3,485,132 | 12/1969 | Hanny et al. | 85/1 C |
| 3,485,282 | 12/1969 | Lopez et al. | 85/63 |
| 3,783,921 | 1/1974 | Wagner | 151/41.7 |

FOREIGN PATENTS OR APPLICATIONS

| | | | |
|---|---|---|---|
| 231,222 | 11/1960 | Australia | 85/46 |
| 17,280 | 9/1894 | United Kingdom | 85/42 |
| 2,055,003 | 5/1971 | Germany | 151/14.5 |

Primary Examiner—Marion Parsons, Jr.
Attorney, Agent, or Firm—Robert W. Beart; Thomas W. Buckman

[57] ABSTRACT

The present invention relates generally to improvements in stud-type fasteners and more particularly to a double-ended type fastener, one extremity of which is provided with sharp crested peripheral protuberances and which carries a volume of heat activatable adhesive. More specifically, the invention incorporates a novel recess in a flange interposed between each end of the fastener and which is adapted to receive adhesive wiped upwardly when the fastener is inserted in a work aperture.

6 Claims, 4 Drawing Figures

PATENTED AUG 5 1975

3,897,713

DOUBLE-ENDED STUD

SUMMARY OF THE INVENTION

Studs of the double-ended variety have been utilized in the past which generally incorporate a pair of coaxially arranged threaded shanks and adapted so that one of said shanks may be inserted in a work aperture and the other shank extends outwardly of the workpiece for subsequent attachment of an associated threaded member thereto. A common problem with such prior art fasteners is the tendency of the shank inserted in the workpiece aperture to back out during subsequent engagement or disengagement of an associated member with the upstanding threaded shank.

It is, accordingly, an object of the present invention to provide a double-ended threaded stud member upon which heat activatable adhesive is carried on one shank portion to lockingly associate the member with an aperture in a workpiece.

A further object of the invention is to provide a double-ended stud member with a flange intermediate the stud sections and which one stud shank may be forced into a work aperture so that a portion of adhesive carried by the shank is wiped up into a recess beneath the flange providing a bond line at the upper surface of the workpiece as well as within the aperture.

An advantage of the present invention is the provision of a recess on a rigid flange member which allows a sufficient volume of adhesive to be received therein without being squeezed out from under the flange during application of clamping loads on the system.

More specifically, the invention contemplates a double-ended stud member with a generally circular flange integral with coaxially arranged shanks. One of the shanks including sharp crested protuberances either helically arranged or longitudinally arranged about the periphery of the shank and which are spaced from one another in order to carry a volume of heat activatable adhesive thereon. The flange will include a recess extending from the shank to an outer bearing surface so that a portion of the adhesive may be wiped upwardly and received therein as the stud member is forced into a preformed work aperture of a predetermined size. Upon application in this manner, the entire system will be subjected to suitable heat to activate the adhesive and provide a locking bond line between the shank and the aperture as well as in a plane perpendicular to the axis of the shank and between the clamping surface of the workpiece and the flange.

DESCRIPTION OF THE PREFERRED EMBODIMENT

Figure 1:
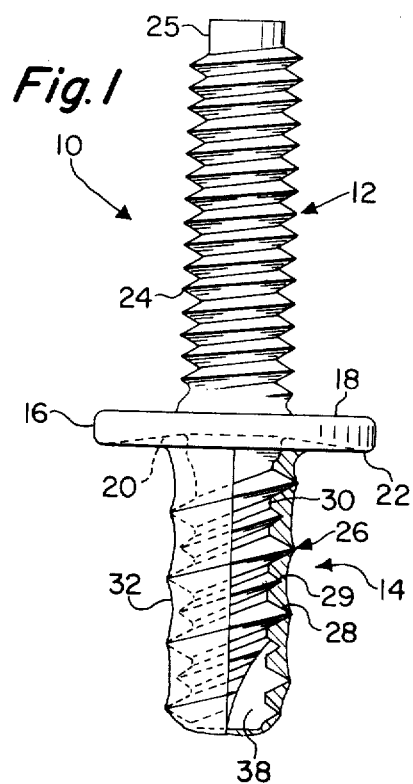
FIG. 1 is a side elevational view of a double-ended stud member with one shank thereof being encapsulated by adhesive, the adhesive being shown in partial section.

Referring now to the drawings in more detail, wherein like numerals have been employed to designate similar parts throughout the various views, it will be seen that one embodiment of the invention contemplates an integral double-ended stud member 10. The stud 10 includes an upper shank portion 12 and a lower shank portion 14 separated by a flange 16. The shank portion 12 may be provided with a thread formation such as machine threads 24. The lower shank portion 14 is provided with rather sharp crested thread formation 26 which, in FIGS. 1 and 2, includes a high crested thread formation 28 and a somewhat smaller thread crested formation 29, each being separated an axial distance by a root portion 30. Shank 14 is encapsulated with a heat activatable adhesive 32, which may either be of the thermosetting or thermoplastic variety. The volume of the adhesive 32 carried by the studs will be sufficient to fill the channel formed between flanks of the threads 28 and 29 and will preferably cover the crests of the lower threads 29 and extend generally to the crest diameter of thread 28 over a substantial portion of the length of the shank for a purpose to be described later herein.

The integral flange 16 will include a recess surface 20 extending from the juncture of the shank 14 with the flange outwardly and downwardly to a peripheral annular bearing surface 22. The upper face surface 18 of flange 16 will be generally planar to present a flat bearing surface for attachments subsequently applied to the upper shank 12.

It will be noted that the thread convolutions 24 and 26 will be of the same hand of rotation so that as an associated threaded fastener is applied to the upper section it will tend to drive the stud member further into the work aperture rather than to dislodge it from the work aperture. It will be further noted that the threaded portion 26, on the lower shank 14, is rather sharp crested and may further include a groove 38 formed in the extremity thereof to facilitate the aggressive cutting engagement of the stud member with an aperture in a workpiece.

The operation of the fastener 10 can thus be described with reference to both FIGS. 1 and 2. The fastener 10 may be readily handled and shipped with the heat activatable adhesive applied thereto since conventional thermoplastic and thermosetting adhesives are available which may be coated on a carrier and retained thereon in a nontacky configuration for subsequent curing upon the application of sufficient heat. The stud member 10 of the present invention is most effectively used in a work aperture 36 in a workpiece 34, which may be of a plastic-type material, and wherein the diameter d1 of the aperture is somewhat smaller than the crest diameter d2, defined by the maximum transverse dimension of stud section 14, such as the crest of thread portion 28. With such a dimensional relationship between the stud and the aperture, the shank 14 may aggressively enter and cut threads in the workpiece with the aid of the thread cutting slot 38. During this forceful entry of the stud within the aperture a portion of the volume of adhesive 32 is wiped up and received within recess 20 in the flange. The recess is preferably void of such adhesive prior to the application so that a predetermined, sufficient volume of adhesive may be retained beneath the flange without allowing the adhesive to be forced outside of the periphery of the flange during the insertion of the stud. When the stud member has been torqued or forced down into the work surface 35, the outer peripheral margin 22 will create high unit pressure between the flange and workpiece and thus will effectively seal the flange relative to the workpiece.

Figure 2:
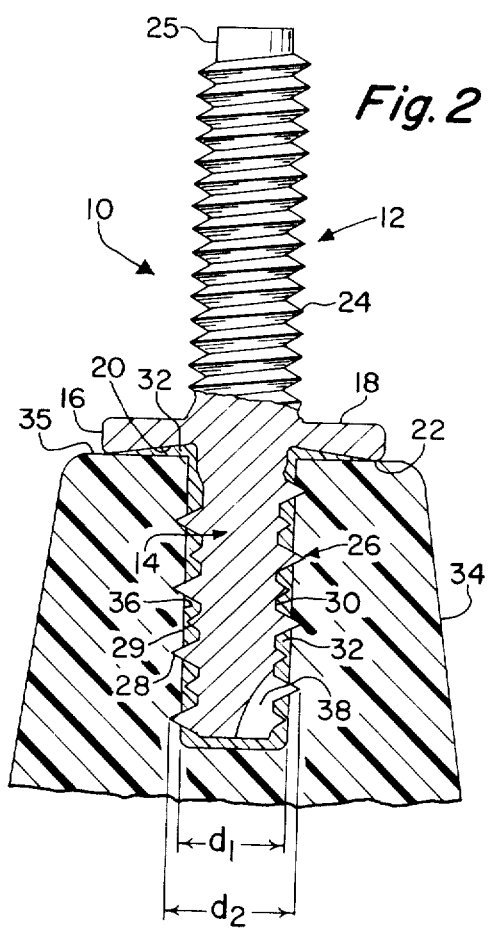
FIG. 2 is a view similar to FIG. 1 showing the double-ended stud member of FIG. 1 after it has been inserted in an associated work aperture.

Thus, it is to be seen from FIG. 2 that the stud member 10 will be effectively locked from relative movement within the aperture 36. The volume of adhesive interposed between the shank 14 and the walls of the aperture 36 will provide a bond line, which in addition to the penetrating crest of the thread, will serve to aid in the locking engagement. The relatively large axial space between the crests of the higher thread 28 will maximize the bonding contact with the walls of the aperture. In the preferred embodiment of FIGS. 1 and 2, the lower thread 29 may serve to locate the stud in the hole as well as increasing the surface contact between the adhesive and the stud shank. The volume of adhesive 32 wiped upwardly and received within the recess 20 will form a controlled bond line in a plane which is generally perpendicular to the plane of the axis thus further insuring the nonrotative locking retention of the stud in the workpiece even under extremely adverse conditions. The annular bearing portion 22 serves to eliminate deleterious leaking of adhesive out from under the flange.

The planar surface 18 on the upper face of the rigid, wafer-like flange will provide a flat support and bearing surface for subsequent attachment and which will not tend to eliminate the recess or force the adhesive received in the recess outwardly. The thin flange will aid in the rapid and efficient conduction of heat to the heat activatable adhesive.

Figure 3:
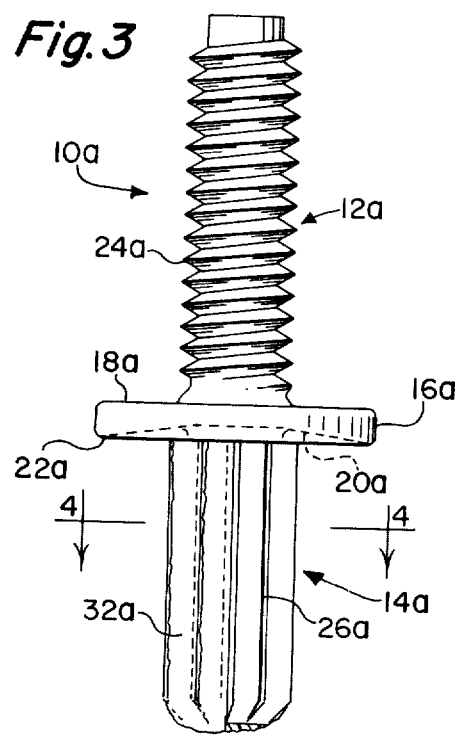
FIG. 3 is a side view similar to that shown in FIG. 1 of an alternate embodiment of the invention.
Figure 4:
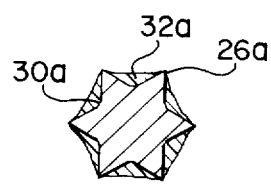
FIG. 4 is a cross-sectional view of the encapsulated shank portion taken along line 4—4 of FIG. 3.

FIGS. 3 and 4 disclose a slightly modified form of the stud member 10a in which an upper section 12a includes thread convolutions 24a similar to the shank 12 in the above described embodiment. The flange 16a will similarly include a recess 20c and a flat planar surface 18a. However, the lower shank portion 14a is provided with longitudinally extending splines 26a which are spaced circumferentially about the periphery of the shank by root sections 30a. The shank 14a is encapsulated with heat activatable adhesive 32a in the same manner as described in the above embodiment. In operation, the stud 10a may be forced or driven into a work aperture with an axial force so that the splines will penetrate the walls of the associated aperture and wipe a portion of the adhesive upwardly into the recess 20a. In this embodiment as well as the previous embodiment, it should be understood that heat may be applied either simultaneously with the insertion of the stud to serve to soften the plastic-type workpiece as well as cure the adhesive or the adhesive may be cured by the subsequent application of heat.

An example of the relative dimensions of a fastener designed in accordance with the invention and which accomplishes the objects of the invention is one in which the adhesive coated shank extends approximately 0.6 inches with a crest diameter of a high thread of approximately 0.28 inches and crest diameter of a low thread of approximately 0.23 inches, a flange of about 0.64 inches in diameter with a recess inclined about 15° to the horizontal. The aperture of a workpiece which may be used with this fastener is preferably about 0.24 inches. It should be understood that this example is not meant to limit the invention in any manner nor is the invention limited to any one embodiment described herein. On the contrary, it is intended to cover all alternatives, modifications and equivalents as may be included within the spirit and scope of the invention as defined by the appended claims.

I claim:

1. A double-ended stud system including coaxially disposed stud shanks separated by an outwardly radiating generally circular rigid flange portion, a first stud shank including a helical thread formed thereon, a second stud shank including a plurality of relatively sharp crested protuberances extending from a root diameter, the sharp crested protuberances being of a generally uniform height along the length of the second stud shank, the flanks of adjacent protuberances being spaced at their juncture with the root diameter providing a plurality of adhesive carrying channels on the shank, a predetermined volume of heat activatable adhesive means carried on said second stud shank and encapsulating the periphery thereof filling the adhesive carrying channels to the crest diameter of the protuberances but not appreciably covering the crests of the protuberances, a recess formed on the face surface of the flange adjacent the second stud shank and extending outwardly and downwardly from the juncture of the second stud shank to a narrow outer peripheral bearing and sealing surface on the flange, the recess being substantially void of adhesive prior to insertion in a bore so that the recess may receive and sealingly retain a predetermined volume of adhesive and provide a controlled bond line beneath the flange as the second stud shank is inserted in a work structure, the face surface of the flange adjacent the first stud shank being essentially a planar surface extending generally perpendicular to the axis of the shanks so that a subsequent attachment load on the first stud section will be applied substantially to the peripheral bearing and sealing surface.

2. The stud system in accordance with claim 1, wherein the sharp crested protuberances are in the form of a spaced helical thread.

3. The stud system of claim 2, wherein the helical thread includes a first long lead thread having a plurality of convolutions and a relatively large predetermined height and being of substantially uniform size and shape throughout, a second long lead thread having a plurality of convolutions and a height substantially less than said predetermined height but greater than the root diameter and being of substantially uniform size and shape throughout, both of said threads being sharp crested, all of the threads having roots of substantially the same axial extent, the adhesive volume being sufficient to cover the crests of the second thread over a substantial axial extent of the shank and not so great as to completely cover the crests of the first thread over a substantial axial extent of the shank to provide a predetermined amount of adhesive wiped upwardly in channels formed between adjacent convolutions of the first thread as the stud is rotatively driven into a hole of less diameter than the crest diameter of the first thread.

4. The stud system of claim 1, wherein the protuberances are in the form of longitudinal splines.

5. The stud system of claim 1, wherein the protuberances on the second stud section are in the form of a spaced thread of the same hand as the thread on the first stud section.

6. A double-ended adhesive carrying stud system including a pair of coaxially arranged threaded stud sections and an integral flange positioned intermediate thereof and radiating outwardly from the axis thereof, a first stud section including a helical machine screw thread formed thereon, a second stud section having a spaced, sharp crested, helical thread formed thereon of the same hand as the thread formed on the first stud section, the helical thread including a first long lead thread having a plurality of convolutions and a relatively large predetermined height and being of substantially uniform size and shape throughout, a second long lead thread having a plurality of convolutions and a height substantially less than said predetermined height but greater than the root diameter and being of substantially uniform size and shape throughout, both of said threads being sharp crested, all of the threads having roots of substantially the same axial extent, the entering extremity of the second stud section including a recess formed therein providing a serrated cutting edge for cutting internal threads in an associated workpiece as the stud is rotatively driven therein, the flange having a generally circular outer periphery and being a thin wafer-like member extending perpendicular to the axis of the stud sections, the face surface of the flange contiguous to the first section being planar while the face surface of the flange contiguous to the second section includes an annular recess extending outwardly from the juncture of the stud shank with the flange to an annular peripheral bearing and sealing portion of the flange, a predetermined volume of heat activatable adhesive carried on the second stud section and of a sufficient volume to cover the crests of the second thread over a substantial axial extent of the shank and not so great as to completely cover the crests of the first thread over a substantial axial extent of the shank, the recess being substantially void of adhesive prior to insertion within a workpiece, wherein the second stud section may be screwed into a bore in an associated workpiece which is of less diameter than the crest diameter of the thread thus permitting a portion of the volume of the heat activatable adhesive to be wiped upwardly in channels formed between adjacent convolutions of the first long lead thread of the second stud section as the stud is rotatively driven into a hole in the associated workpiece and sealed between the workpiece and the recess, providing a controlled bond line of adhesive between the flange and the workpiece as well as between the second stud section and the workpiece upon application of sufficient heat to the system.

* * * * *